July 27, 1965
W. E. RICE
3,197,232
VEHICLE SPRING SUSPENSION
Filed July 20, 1962
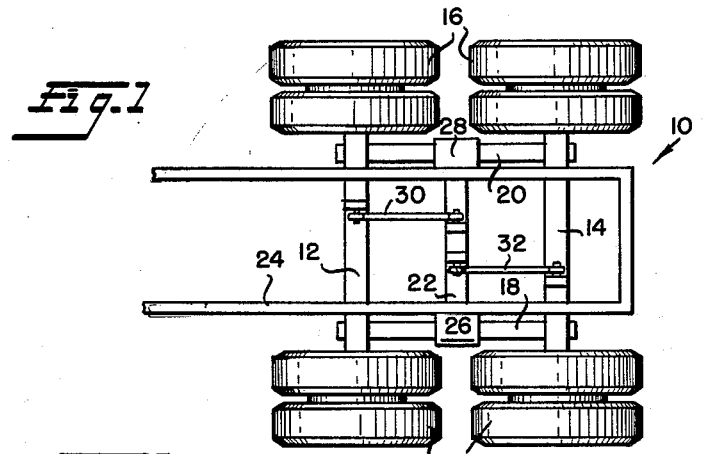
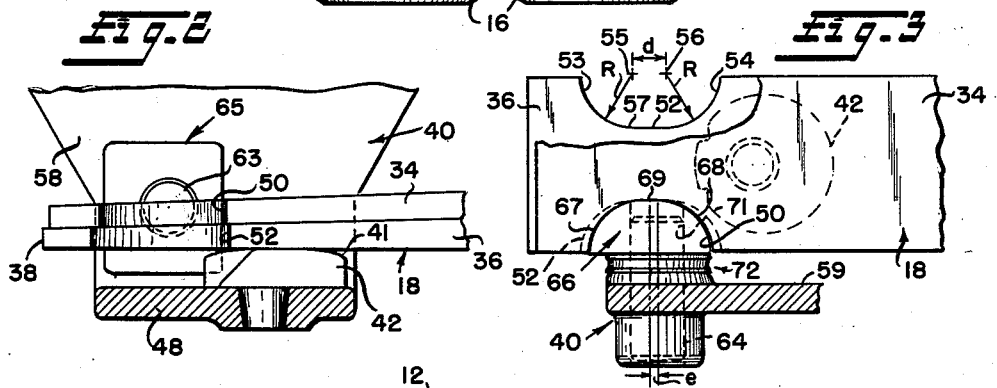
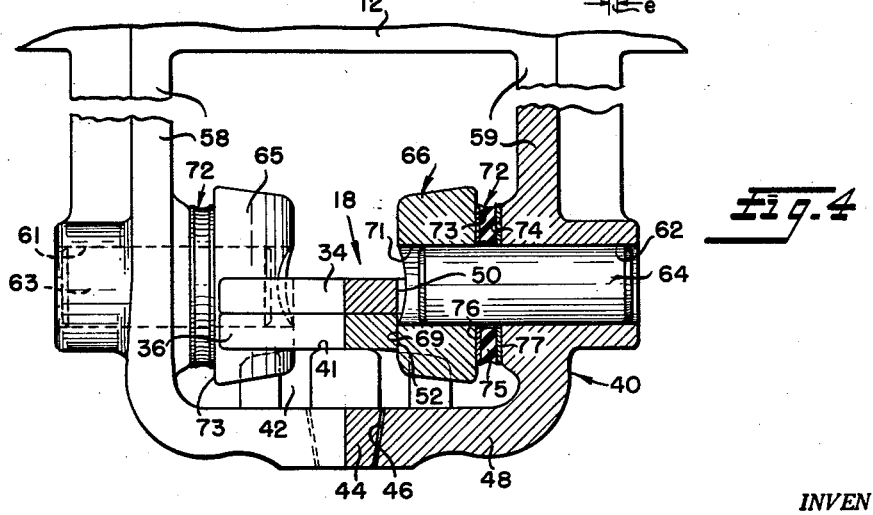
INVENTOR.
William E. Rice
BY
*Strauch, Nolan & Neale*
ATTORNEYS United States Patent Office 3,197,232
Patented July 27, 1965

3,197,232
VEHICLE SPRING SUSPENSION
William E. Rice, Ferndale, Mich., assignor, by mesne assignments, to Rockwell-Standard Corporation, a corporation of Delaware
Filed July 20, 1962, Ser. No. 211,311
13 Claims. (Cl. 280—104.5)

This invention relates to vehicle suspension systems and more in particular to special leaf spring end mounting arrangements.

In U.S. Letters Patent No. 2,999,695 issued September 12, 1961 to Leo A. Bixby et al. for Suspension for Tandem Axle Assembly, there is disclosed spring end connections wherein rectangular notched spring ends interfit with rectangular blocks pivotally mounted in axle carried hanger brackets to hold the spring ends in the brackets while permitting easy removal but at the same time allow limited free articulation of the spring ends under all operating conditions. The present invention provides certain important improvements over the structure disclosed in the above patent resulting in the increased elimination of stress concentration and the absorbtion of compressive thrust load.

Accordingly, it is the major object of this invention to provide novel leaf spring end attachments particularly in a tandem axle spring suspension for a vehicle, comprising pivot blocks having novel arcuate surface coaction with arcuate lateral notches in the spring ends to eliminate stress concentration, misalignment and pounding at the spring ends.

A further object of the invention is the provision of a novel suspension connection to an axle structure wherein a rockable suspension side member having its ends bearing on wear plates on axle mounted brackets has opposite mainly arcuate special side notches that interfit with correspondingly shaped pivot blocks on the brackets.

A further object of the invention is to provide a novel pivot block and lateral cushion assembly for a spring end connection.

Another object of the invention is to provide a novel spring end connection wherein the spring end is specially notched to receive axle mounted pivot blocks, and resilient lateral cushion means is provided between the blocks and the axle structure to cushion side thrust loads and more efficiently equalize the driving loads imposed on the spring ends to reduce wear.

Another object of the invention is to provide a novel tandem axle suspension assembly wherein the opposite ends of the rockably mounted springs or other suspension side members are notched for vertical sliding and limited lateral rocking connection with pivot members such as blocks coaxially pivoted on the axle on an axis transversely of the vehicle.

Further objects of the invention will appear as the description proceeds in connection with the appended claims and the annexed drawings in which:

FIGURE 1 is a diagrammatic top plan view of a tandem axle assembly provided with a preferred embodiment of the invention;

FIGURE 2 is an enlarged fragmentary side view partly in section showing a spring end connection;

FIGURE 3 is a top fragmentary view of the spring end connection shown in FIGURE 2 with the inner side of the bracket and its pivot block being omitted for illustration of the notch structure; and FIGURE 4 is a greatly enlarged end view of the spring end connection of FIGURES 2 and 3 partly shown in cross-section to show the pivot block and notched spring end association.

FIGURE 1 illustrates a tandem axle assembly 10 comprising spaced parallel axles 12 and 14 supported at their outer ends by ground engaging wheels 16 and interconnected by suspension side members that here are leaf springs 18 and 20 pivoted at their center portions upon the ends of a cross tube 22 fixed transversely beneath the frame 24 by depending frame mounted brackets 26 and 28. Axles 12 and 14 may be driving or non-driving axles, or only one axle may be a driving axle, all such constructions being embraced within the meaning of a tandem axle assembly embodying the present invention. Conventional torque rods 30 and 32 are operatively interposed between axles 12 and 14 and a cross member (not shown) rigid with the frame 24 to resist the turning effect on the axles about their axle due to brake and drive torque reactions.

Apart from the spring end connections the axle, spring and frame structures are all essentially conventional and require no further disclosure as to either construction or operation. Springs 18 and 20 are independently pivoted on opposite sides of the frame and are substantially parallel longitudinally of the fame.

The four opposite ends of springs 18 and 20 are connected to the axles 12 and 14 as illustrated in FIGURES 2 to 4 according to a preferred embodiment of the invention, and it will be understood that all end connections are similar to those shown although certain details may be reversed at opposite ends.

In the present instance suspension springs 18 and 20 each comprise a similar dual taper leaf spring assembly. Spring 18 consists of an upper leaf 34 and a lower leaf 36 which is slightly longer than leaf 34 as indicated at 38 for a purpose to appear. The ends of leaves 34 and 36 extend through a generally U-shaped hanger bracket 40 rigidly suspended from axle 12 as shown in FIGURE 4 and bottom leaf 36 rests upon the hardened spherical bearing surface 41 of a wear pad 42 having a tapered shank 44 secured within a tapered aperture 46 in the bottom wall 48 of bracket 40.

Longitudinally outwardly of wear pad 42, the end of upper spring leaf 34 is provided at opposite sides with similar aligned generally semicircular notches 50 (FIGURE 3) and the adjacent end of lower leaf 36 is provided with generally semicircular notches 52 which under static normal load conditions are vertically centrally aligned with notches 50 of the upper leaf 34. Notches 52 are thus of the same depth but slightly longer than notches 50. The curved circular end surfaces of notches 50 and 52 are actually cut on identical radii whose centers are spaced apart longitudinally of the spring.

Reference is made to FIGURE 3 which shows how the lower leaf notch 52 is formed. The circular end surfaces 53 and 54 are substantially quadrants of the same circle having a radius R but their centers 55 and 56 are spaced apart a distance $d$ longitudinally of the spring leaf. The inner ends of circularly curved surfaces 53 and 54 are smoothly joined by a straight line 57 which may be tangent to both. Each notch 52 therefore has an open side along the edge of the spring leaf which is longer than twice the radius of each curved surface 53, 54. Each corresponding notch 50 above notch 52 is similarly formed except that the distance $d$ between centers of the curved surfaces is less, so that upper notch 50 is effectively shorter than notch 52.

Hanger bracket 40 has opposed rigid parallel legs 58 and 59, and fixed in axially aligned lateral bores 61 and 62 formed in the respective bracket legs are cylindrical pins 63 and 64 of the same size. Each pin 63 and 64 extends the same distance into the interior of bracket 40 toward the adjacent spring end.

Freely pivotally mounted on the ends of pins 63 and 64 respectively are identical eccentric rigid metal pivot blocks 65 and 66 respectively which extend into the spring end notches. As shown in FIGURE 2, each pivot block is vertically oblong, and as shown in FIGURES 3 each pivot block has laterally substantially the generally semicircular shape of the spring end notches.

Actually, see FIGURE 3, the lateral contour of the pivot block 66 is such as to provide circular end surfaces 67 and 68 joined by a short straight section 69. The radii of surfaces 67 and 68 is essentially the same, within tolerances, as notch surfaces 53 and 54, and the length of section 69 is such that the block enters and almost fills shorter notch 50. It will be noted that the block thus has more play longitudinally of the lower spring leaf 36 which during operation has more movement in that direction than the upper leaf.

The laterally arcuate fit between the pivot blocks and the notched spring ends permits slight rocking and relative angularity between the spring and axle while restricting relative movement longitudinally between the axle and the spring without undue stress on the end connections.

As shown in FIGURE 3, the bore 71 of pivot block 66 is displaced from the transverse axis of block 66, which would be a line perpendicular to surface 69 midway between the curved end surfaces to provide an eccentricity $e$. As shown in FIGURE 4, bore 71 is centered vertically in the block. This arrangement compensates for greater rotational movements in opposite directions and provides for axle spacing adjustment.

The length of each pivot block, that is its dimension between the curved surfaces in the longitudinal direction, is so related to the associated spring end notches as to restrict relative longitudinal displacement of the axle relative to the spring ends, while permitting free pivotal movement between the axles and spring ends.

Each block 65 and 66 at the respective spring ends is similarly eccentrically mounted for free rotation on pins corresponding to those at 63 and 64, it being understood that each set of opposed blocks is located longitudinally beyond the associated wear pad in the direction of the adjacent spring end, and each block has the eccentricity $e$ in that same direction with respect to its supporting pivot pin.

As shown in FIGURE 4, a flat resilient cushion and wear reduction disc assembly 72 is provided between the flat back surface 73 of each block and the adjacent flat inner surface 74 on each bracket leg. Each cushion assembly comprises an annular rubber or like resilient pad 75 flanked on opposite sides by thin metal washers 76 and 77 which are preferably vulcanized or otherwise permanently bonded to the sides of the rubber pad.

Each cushion assembly 72 has a sliding rotative fit on its associated pin, and its bore is such as to permit some angular washer movement without binding on the pin during vehicle operation.

In the assembly the relative lateral dimensions and locations of blocks 65 and 66 and their back-up cushions 72 on the pins is such that the blocks fit snugly into the spring end notches with the flat end surface 69 of each block in sliding contact with the bottoms of the associated notches, and the relaxed cushion assemblies 72 occupying the spaces between the blocks and bracket legs as shown in FIGURE 4. In effect cushion assemblies 72, while not necessarily under compression when the vehicle is at rest, provide means for resiliently urging the pivot block laterally into the associated spring end notches.

The pivot blocks 65 and 66 during operation are in constant contact with the inner surface of the notches 50 and 52 so that all side and twisting loads of the spring ends during articulation are transferred therethrough and will be absorbed by cushion assemblies 72. Washers 76 and 77 reduce wear and are adapted to prevent torsional forces from being transmitted from the blocks into the rubber pads and also retain the rubber pads in position to absorb compressive loads without the rubber being squeezed out.

The foregoing resilient back-up pad cushion arrangement constitutes an important improvement over similar prior assemblies in that side forces and twisting loads from the frame will be directly absorbed instead of being transferred to the blocks, thus greatly reducing wear and possible breakage at the spring notch locations. An added advantage of these cushion assemblies is that noise at the spring end connections is greatly reduced in that the resilient cushion assemblies tend to hold the pivot blocks in constant contact within the spring notches under all driving conditions. During vehicle operation the cushion assemblies compress to permit some relative lateral displacement between the spring ends and the axles without interfering with the pivot action.

From the foregoing it is apparent that the invention provides an improved block and notch construction between the axles 12 and 14 and springs 18 and 20 which permits free pivotal movement between the axles and spring ends about the axis of pins 63 and 64. This is achieved by means of the semi-cylindrical pivoted blocks in cooperation with the semicircular notches which as above explained are just sufficiently longer than the blocks to prevent binding during spring action. The semicircular shape affords a better stress distribution and eliminates scraping and sliding wear.

In the articulated spring position the pivot blocks take a position on their respective pins in which the vertical sides of the blocks remain in substantially parallel relation to the sides of the associated spring end notches. Limited lateral movement and diagonal articulation of the wheels is made possible by the rubber cushion which absorbs the respective thrust forces. In a dual leaf spring assembly as illustrated herein, the lower leaf is made slightly longer and the semicircular notches of the lower leaf are made wider than the notches in the upper leaf to compensate for a greater relative movement of the lower leaf in relation to the upper leaf. The spring ends are easily detached from the axle for servicing the axle.

The improved construction as disclosed in the foregoing description assures a better riding quality under all road conditions and considerably reduces noise, stress and wear at the spring ends.

The invention may also be applied to a tandem axle suspension of the type wherein the pivoted suspension side member is a rigid walking beam type member, and the vertically straight laterally arcuate notches are formed at its ends like in the spring above described. The term suspension side member in the claims includes both rigid beams and flexible springs.

The present invention may be embodied in other specific forms without departing from the spirit or essential characteristic thereof; the present embodiments therefore are to be considered in all respects as illustrative only and not restrictive, the scope of the invention being indicated by the appended claims rather than by the foregoing description.

What is claimed and desired to be secured by Letters Patent is:

1. In a vehicle suspension assembly for tandem axles, a longitudinally extending suspension side member rockably mounted intermediate its ends and having flexible end connection with spaced axles, at least one end connection comprising opposed blocks laterally rockably and vertically slidably mounted in similar opposed side notches adjacent the end of the member and coaxially pivotally connected to the axle, said notches having vertically straight laterally arcuate surfaces slidably engaging similar surfaces on said blocks, and resilient cushion members interposed laterally between each of said blocks and the axle.

2. In a vehicle tandem axle suspension assembly, opposite leaf spring suspension side members rockably connected to the vehicle frame intermediate their ends and flexibly connected at both ends to the ends of transverse axles, each such flexible connection comprising pivot members coaxially pivoted on the associated axle and laterally rockably and vertically slidably mounted in open side notches on the ends of the suspension side member, said notches having vertically straight laterally arcuate surfaces engaging similarly shaped surfaces on said pivot members, and resilient cushion means laterally mounted between each of said pivot members and its associated axle.

3. In a tandem axle assembly for a vehicle, two spaced transverse axles supported at opposite ends by ground engaging wheels, suspension means comprising longitudinal members at opposite sides of the vehicle rockably mounted intermediate their ends on the vehicle frame, and means connecting the ends of the axles to the ends of said suspension members comprising at each end of each suspension member a generally U-shaped bracket depending from the axle, a pad on said bracket slidably underlying the associated end of said suspension member, blocks coaxially pivoted within the bracket and projecting into opposed vertically straight laterally arcuate side notches in said suspension member, said blocks being formed with arcuate surfaces in rocking sliding engagement with said suspension member within said notches, and laterally resilient cushion means between each of said blocks and the bracket.

4. An end connection between a longitudinally rockable vehicle suspension side member of a tandem axle assembly and an axle comprising opposite laterally open similar vertically straight laterally arcuate side notches in the end of said member, opposed coaxial pivot blocks on the axle extending into said notches and formed with similar arcuate surfaces in rocking sliding engagement with said suspension member within said notches, each of said blocks and its associated notch being formed for relative sliding movement vertically and for limited relative rocking movement laterally and resilient cushion means interposed between each said block and the axle.

5. In the end connection defined in claim 4, each said notch and the associate surface on said block being formed with similar longitudinally spaced circularly curved end surfaces of substantially the same radius and the laterally open side of said notch being longer than twice said radius.

6. In a tandem axle assembly of the type wherein suspension side members are rockably connected to the vehicle frame intermediate their ends and flexibly connected at both ends to the ends of transverse axles, each such flexible connection comprising side notches on the ends of the suspension side member, pivot members slidably engaged with said notches, opposed axle mounted fixed pivot pins upon which said pivot members are freely rockable, and a resilient annulus surrounding each pivot pin and laterally disposed between each said pivot member and an adjacent part of the axle.

7. In the tandem axle assembly defined in claim 6, each said resilient annulus comprising a disc of resilient material sandwiched between metal washers that engage respectively said pivot member and said axle part.

8. An end connection between a longitudinally rockable tandem axle vehicle suspension side member and an axle comprising similar opposite laterally concave symmetrical side recesses in the end of said member, opposite coaxial pivot pins on said axle, and pivot blocks freely rotatably mounted on said pins and vertically slidably fitting with said notches, said pivot block each having laterally convex symmetrical surfaces corresponding in shape to and fitted into said notches, and the pivot axis of said pivot blocks being eccentric with respect to the axis of symmetry of said convex surface whereby selective longitudinal spacing of the vehicle axles may be determined.

9. In an end connection between a transverse axle member and a longitudinally rockable vehicle suspension side member of a tandem axle assembly that is composed of two superposed spring leaves, means providing opposite laterally concave symmetrical side recesses in each of said spring leaves near said end, said recesses being superposed at each side with the recesses in the lower spring leaf being slightly longer than those in the upper leaf, coaxial transversely pivoted members on said axle extending into and having laterally convex surfaces shaped correspondingly to said recesses and more closely fitting with the recesses of the upper leaf, whereby said side member has a laterally rockable connection with said axle mounted pivot members, and resilient cushion members interposed between each of said pivot members and the axle.

10. An end connection between a longitudinal tandem axle suspension side member rockably mounted on a vehicle frame and an axle structure supported by ground engaging wheels comprising support means on the axle underlying an end of said member, vertically straight laterally arcuate notches on opposite sides of said member at said axle, and pivot members extending into said notches coaxially rotatably mounted on said axle above said support means on an axis extending transversely of the vehicle, said pivot members being shaped similarly to said notches and being blocks eccentrically pivotally mounted on laterally extending support pins on said axle whereby selective longitudinal spacing of the vehicle axles may be determined.

11. An end connection between a longitudinal tandem axle suspension side member rockably mounted on a vehicle frame and an axle structure supported by ground engaging wheels comprising support means on the axle underlying an end of said member, vertically straight laterally arcuate notches on opposite sides of said member at said axle, pivot members extending into said notches coaxially rotatably mounted on said axle above said support means on an axis extending transversely of the vehicle, said pivot members being shaped similarly to said notches, and resilient cushion means provided laterally between each said pivot member and the axle.

12. In a vehicle suspension assembly for tandem axles, a longitudinally extending suspension side member rockably mounted intermediate its ends and having flexible end connection with spaced axles, each said end connection comprising axially aligned pivot members substantially vertically slidably disposed in oppositely open similar side notches adjacent the end of said suspension member and pivotally mounted on the axle, said notches being laterally arcuate and said pivot members being correspondingly shaped to fit thereinto and said pivot members comprising blocks eccentrically pivotally mounted on coaxial pivot pins on said axle whereby selective longitudinal spacing of the vehicle axles may be determined.

13. In a vehicle suspension assembly for tandem axles, a longitudinally extending suspension side member rockably mounted intermediate its ends and having flexible end connection with spaced axles, each said end connection comprising axially aligned pivot members substantially vertically slidably disposed in oppositely open similar side notches adjacent the end of said suspension member and pivotally mounted on the axle, said notches being laterally arcuate and said pivot members being correspondingly shaped to fit thereinto, and lateral cushion means between each of said pivot members and said axle.

References Cited by the Examiner
UNITED STATES PATENTS

| | | | |
|---|---|---|---|
| 1,623,844 | 4/27 | Kogstrom | 267—54 |
| 2,973,951 | 3/61 | Billing | 267—54 X |
| 2,999,695 | 9/61 | Bixby | 280—104.5 |

A. HARRY LEVY, *Primary Examiner.*